(12) United States Patent
Knoop et al.

(10) Patent No.: US 8,763,469 B2
(45) Date of Patent: Jul. 1, 2014

(54) WIND POWER PLANT HAVING MULTIPLE CONSTRUCTION SECTIONS

(75) Inventors: Frank Knoop, Aurich (DE); Guido Trauernicht, Grossefehn (DE); Tina Maria Trauernicht, legal representative, Grossefehn (DE); Marie Annette Trauernicht, legal representative, Grossefehn (DE); Anna Marie Trauernicht, legal representative, Grossefehn (DE)

(73) Assignee: Aloys Wobben, Aurich (DE)

( * ) Notice: Subject to any disclaimer, the term of this patent is extended or adjusted under 35 U.S.C. 154(b) by 778 days.

(21) Appl. No.: 12/936,180

(22) PCT Filed: Apr. 2, 2009

(86) PCT No.: PCT/EP2009/002401
§ 371 (c)(1),
(2), (4) Date: May 25, 2011

(87) PCT Pub. No.: WO2009/121594
PCT Pub. Date: Oct. 8, 2009

(65) Prior Publication Data
US 2011/0232071 A1   Sep. 29, 2011

(30) Foreign Application Priority Data

Apr. 2, 2008 (DE) .......................... 10 2008 016 925

(51) Int. Cl.
*F16B 31/02* (2006.01)

(52) U.S. Cl.
USPC ........................................ 73/761; 73/170.01

(58) Field of Classification Search
USPC .............................. 73/760, 761, 168, 170.01
See application file for complete search history.

(56) References Cited

U.S. PATENT DOCUMENTS

| | | | |
|---|---|---|---|
| 5,884,232 A * | 3/1999 | Buder | 702/42 |
| 6,843,628 B1 | 1/2005 | Hoffmeister et al. | |
| 7,024,746 B2 * | 4/2006 | Weeks et al. | 29/407.08 |
| 7,245,759 B2 * | 7/2007 | Jones et al. | 382/152 |
| 7,364,043 B2 * | 4/2008 | Ong et al. | 209/652 |
| 7,412,898 B1 * | 8/2008 | Smith et al. | 73/761 |
| 7,536,764 B2 * | 5/2009 | Weeks et al. | 29/407.08 |
| 8,400,446 B2 * | 3/2013 | Gatzke et al. | 345/419 |
| 2006/0000185 A1 | 1/2006 | Wobben | |

FOREIGN PATENT DOCUMENTS

| | | |
|---|---|---|
| DE | 3327964 A1 | 2/1985 |
| DE | 101 33 116 | 1/2003 |
| DE | 101 44 167 C1 | 2/2003 |
| JP | 2002239939 A | 8/2002 |
| JP | 2005-533952 A | 11/2005 |
| WO | 00/63565 A1 | 10/2000 |

* cited by examiner

*Primary Examiner* — Max Noori
(74) *Attorney, Agent, or Firm* — Seed IP Law Group PLLC

(57) ABSTRACT

A wind turbine is proposed which has a plurality of construction sections each having at least one connection region for connecting at least two construction sections to one another, a plurality of fasteners to fasten at least two connection regions of two construction sections to one another, and an identifier for each fastener to distinguish it from other fasteners. A testing device to test the fasteners of a construction section of a wind turbine having a tool section for tightening and/or retightening the fasteners to obtain a desired tightness and/or to test the fasteners with regard to tightness, and a detection unit for detecting an identifier of each fastener.

13 Claims, 5 Drawing Sheets

WIND POWER PLANT HAVING MULTIPLE CONSTRUCTION SECTIONS

BACKGROUND

1. Technical Field

The present disclosure relates to a wind turbine comprising a plurality of construction sections.

2. Description of the Related Art

A modern and hence large wind turbine is usually assembled in situ from a large number of individual elements. Large construction sections, such as steel tower segments, rotor blades and the rotor hub are typically fastened to each other in many cases using releasable fastenings, in particular by bolting them to each other. A steel tower of a larger wind turbine, for example, may be assembled from a plurality of steel tower segments. In order to connect two steel tower segments, these typically have two circumferential flanges in their connection region, said flanges having a plurality of bores for connection by means of bolts and nuts. Such a flange may typically comprise more than 100 bores, so more than 100 bolts with associated nuts are accordingly used to connect two steel tower segments.

To produce the connection, the two steel tower segments typically are aligned one above the other, and the bolts with nuts are disposed, although usually these are not immediately fastened tight. Not until a second or later step are all the bolts and nuts tightened with the desired final strength. This is usually carried out for one bolt after the other until all the bolts of the respective flange have been tightened. Whether all the bolts are actually tightened or not depends at present on the alertness of the fitter on site. Since the bores and hence also the bolts are arranged uniformly in the flange with regard to both position and size, it can easily happen that a bolt is skipped or doubly tightened. In order to prevent this error from occurring, the number of bolts already tightened may be counted. However, this cannot solve the problem reliably because doubly tightened bolts would also be counted as two bolts, and conversely, when some bolts are skipped, other bolts are doubly tightened at the end of the tightening procedure, with skipped bolts thus being overlooked.

However, the stability of a wind turbine usually requires that all the bolts provided are also tightened, and the risk of some bolts not being tightened or not being correctly tightened also harbours the risk of destabilising the wind turbine in its construction. Similar problems may occur when connections between two construction sections of a wind turbine need to be retightened or checked at a later date. Such checking or retightening may be carried out when a service interval has elapsed, for example, or also when components are replaced.

At this point, reference is made in general to the following documents: DE 101 44 167 C1, DE 33 27 964 A1 and WO 00/63565 A1.

BRIEF SUMMARY

The present disclosure relates to a wind turbine comprising a plurality of construction sections, each having at least one connection region for connecting at least two construction sections to one another and a plurality of fastening means for fastening at least two connection regions to one another. The present disclosure further relates to construction sections for such a wind turbine and to a testing device for testing the fastening means of such a wind turbine. The present disclosure also relates to a method for installing a wind turbine and to a method for testing the fastening means of a connection region of two construction sections of such a wind turbine.

An embodiment eliminates the aforementioned problems as far as possible and in particular to provides a solution with which errors in connecting and fastening construction sections of a wind turbine to each other are prevented or at least reduced.

According to an embodiment, a wind turbine is proposed in which an identifier for each fastening means is provided to distinguish it from other fastening means.

A wind turbine according to an embodiment has a plurality of construction sections, such as tower foundations, tower segments, a machine house, a rotor hub and rotor blades. These construction sections have at least one connection region for connecting at least two construction sections to one another. Such a connection region may, for example, be a flange provided with bores. In one other example, threaded rods may be provided. A combination of these is likewise conceivable, in which the tower foundations, for example, have a region prepared with threaded rods or the like, onto which a first tower segment, as a construction section having a circumferential flange as connection region, is then fitted.

In order to connect and in particular to fasten the sections, a plurality of fastening means, in some cases up to 100 and more, are used. Each of these may, for example, be a bolt with a nut. Such a bolt is guided through a common bore through two adjacent flanges and fastened with the aid of the nut. A screw thread may also be provided, in principle, in order to add to or substitute for the nut.

An identifier is provided for each fastening means, i.e., for each bolt-and-nut pair in the above example. With the aid of this identifier, it is possible to distinguish between the fastening means of a connection region that otherwise are practically identical or at least very similar. It is beneficial to provide an identifier in such a way that all the attachment devices of at least one connection region are individualized. When a connection region has 50 fastening means, for example, these could be numbered 1 to 50. However, it may also suffice in some cases to give different identifiers to some bolts only, for example to bolts that are immediately adjacent, in order to distinguish them. In the example cited, the numbers zero to 9 could be assigned five times, for example.

By means of such identification, in particular with individualization of the fastening means, it is possible to establish, in a simple manner, which fastening means have already been tightened and for which ones this is not yet the case. In this way, any proneness to human error, in particular any skipping of a fastening means when tightening or checking, can be largely prevented. By individualization, it is possible in a simple manner to tighten or to check some of the fastening means and to continue with tightening or checking of the other fastening means at some later time, for example after a break or on the following day. Even the fitters can take turns at this activity, without a risk of the new fitter being in doubt about where his co-worker stopped.

In addition, any problems arising with a particular fastening means can also be clearly associated with that fastening means. If, in the case of a bolt connection, for example, it is difficult to bolt such a fastening means, then this can be noted for that bolt and checked when time allows.

There are many conceivable types of identifier, such as simple consecutive numbering, for example, or the allocation of letters. Coded identifiers may similarly be allocated. Another basic option is an identifier with which all the fastening means of a wind turbine are individualized. The identifier can then be composed of a consecutive number and an item of information about the connection region or the construction section to which the fastening means is allocated (e.g., bolt no. 47 in the eighth tower flange). The identifier may also be supplemented with a characteristic of the fastening means, such as the intended tightening torque in the case of a bolt connection, for example.

In an embodiment, it may be preferred that the identifier is affixed to a connection region. Thus, the identifier is not or not exclusively disposed on the respective fastening means itself, but rather at the respective position for the fastening means. This has the advantage that the identifier can be affixed even before the respective fastening means is disposed. The identifier for a plurality of fastening means can also be affixed in the factory workshops during manufacture of the respective construction sections, before assembly of the wind turbine on site. In that case, the fastening means do not receive their identifier until the fastening means are inserted at the respective place in the connection region.

When a fastening means is replaced, the identifier remains in place and is allocated to the newly inserted fastening means.

If, according to another embodiment, fastening means are used which each comprise at least one bolt with at least one associated nut, as is widespread, then the identifier can be affixed to the respective nut and additionally or instead to the bolt. On the bolt, the identifier can then be disposed on the bolt head, for example, or on a bolt tip, i.e., on the part of the bolt facing away from the bolt head. Conceivable locations on the nut include, in particular, the contact surfaces for applying a wrench, provided that the identifier can withstand such mechanical stress.

If the identifier is affixed to the fastening means directly, for example to the bolt or the nut, then this can also be done after disposing the fastening means in the respective connection region. In this way, each fastening means in a series is given an identifier that reflects the position of the fastening means. However, the identifier may also be affixed to the fastening means before assembly.

It often suffices if the identifier is machine-readable. In this case, especially, disposing the identifier in a specific sequence is unimportant, since allocation reflecting a series can also be carried out afterwards, for example in a data processing system. The fastening means and their position can thus be given an arbitrary code. The code may differ from every other code given to the other fastening means, for example, other fastening means in a set.

According to other embodiments, different variants of the identifier are thus provided. In many cases, the identifier can be coded, as already described. In one case, the identifier is magnetic and it can be read using a suitable reader, as known, for example, from cheque cards and credit cards with magnetic strips. Another variant is achieved with mechanical shapes or surface design. Raised areas may be provided, or shapes such as recesses and elevations. One particularly simple option is to provide embossments. Such identifiers are especially robust. Affixing of identifiers by surface etching is also conceivable.

Another proposed variant is the use of an electronic chip. The desired identifier can be stored thereon and read when needed. When using a chip or some other solution suitable for writing onto, a test result or some other information, such as the time and date of a test, can be added to the identifier. In particular, such information can be written onto the medium which carries the identifier.

Another embodiment is an electronic resonant body in which the identifier can be coded in the form of different resonance frequencies. According to yet another embodiment, it is proposed that an identifier be used that is suitable for optical detection. This includes any type of marking with letters and/or numbers or other signs. In particular, a barcode is provided that can be provided in a simple and proven manner and which can also be read. A barcode can also be applied by etching.

In an embodiment, it may be preferred that the identifier is applied by means of stickers. When a barcode, in particular, is used, it can be printed onto an adhesive material, and the adhesive material can then be affixed to the desired place. For example, an adhesive strip with a plurality of barcodes can be disposed on the inner side of the circumferential annular flange of a tower segment. A barcode is then provided on such a circumferential strip for each bore in the flange and hence for each fastening means. Such an adhesive strip can be affixed in a simple manner, for example it can be affixed to the annular flange in the last step in manufacturing the tower segment mentioned by way of example.

At least one construction section is preferably configured thereby as a tower segment and/or a connection region is preferably configured as a flange connection or also as an annular flange. Such tower segments and flange connections are generally known for wind turbines when steel towers are used, and usually have a plurality of bores. Owing to its circular configuration, it is often different or indeed impossible to determine where the beginning or end of such a flange connection is. The risk of doubly tightening or skipping fastening means such as bolt-and-nut pairs is therefore especially great. Identification can be achieved in a simple manner by using an identifier.

According to another aspect of an embodiment, a construction section for a wind turbine is provided which has an identifier for each fastening means.

According to an embodiment, a testing device for testing the fastening means of a construction section of a wind turbine is proposed, said testing device being prepared for tightening and/or retightening the fastening means in order to produce a desired tightness and/or to test the fastening means with regard to its tightness, and which is prepared for detecting the identifier of each fastening means.

Such a testing device may be a tool, such as a torque wrench, that is provided for tightening fastening means. It can therefore be used for tightening during assembly and also for retightening during a later check or maintenance work. The desired tightness of a fastening means may also be checked, usually, while the fastening means is being retightened.

The testing device also detects the respective identifier of the fastening means during or immediately before or after tightening. The testing device thus has a tool section with which it is possible to act mechanically on the fastening means. In addition, the testing device has a reader or the like for detecting the identifier.

In order to detect the identifier, in an embodiment the detection unit is preferably mounted on the testing device in such a way that during testing and/or tightening of each fastening means its associated identifier can be read. The testing device is thus configured in such a way that the respective fitter essentially only needs to concentrate on checking or tightening the fastening means when operating the device. The identifier of the fastening means being processed can be automatically detected at the same time, or the operator of the device can trigger detection of the identifier with little effort, for example by operating a switch. In the case of automatic detection of the identifier, the testing device is prepared in such a way that it detects checking or tightening activity and can itself trigger detection of the identifier. For this purpose, a pushbutton switch or the like can be provided on the tool section, said switch or the like being operated by placing the tool section on the fastening means.

The testing device in an embodiment preferably includes a data processing device that is prepared to process data of the fastening means, in particular to read, store, analyse, transmit and/or output said data. Such a data processing device may be a microcomputer, microcontroller or similar. The data of the fastening means may include not only the respective identifier but also the test result. After being read, the test result basically has to be assigned to the respective identifier and stored in memory or at least in intermediate memory. Other data to be processed may include the date and time, or data about the respective user of the testing device, for example the name of the fitter. If such a fastening means is found to be so defective that it is at least partially replaced, then in one variant this fact also can be detected with the data processing equipment.

Analysing the data includes checking whether a fastening means was omitted when checking tightening or retightening, in particular. This can also be carried out in such a way, for example, that the testing device displays all those fastening means that have not yet been checked, tightened or retightened as of the day of testing. In another example the fitter than enters a completion message when he believes he has checked all the fastening means of a connection region, and the testing device confirms whether this has actually happened for all the fastening means.

However, analysis may also extend to other values, such as the amount of force or torque absorbed during tightening or retightening. This amount of force or torque can be analysed, then stored, transmitted and/or outputted along with the analysis.

Transmission of these or other data is preferably to a data processing device or database that is external to the testing device. Such transmission may be performed online or offline, by radio or by cable connection, or by replacing a storage medium such as a memory chip. The data may also be stored on a storage medium, fetched therefrom and added to. In one embodiment, such a storage medium can be inserted into the testing device when required and is otherwise deposited at a central location, for example inside the wind turbine. For this purpose, the testing device is accordingly prepared, for example with a suitable slot, to accommodate suitable memory cards.

According to an embodiment, a method for installing a wind turbine is proposed, in which two construction sections of the wind turbine are connected in their connection region by a plurality of fastening means, and in which a respective identifier is disposed at or on the respective fastening means. These steps may be carried out in the aforementioned order or in some other order. Expressed differently, the identifier may be affixed before or after the construction sections are connected. The identifier may be affixed directly onto the respective fastening means or in its proximity to at least one of the construction sections.

The method preferably also includes the steps of tightening and/or retightening the fastening means, and checking the tightening and/or retightening for completeness, in particular, thereby having regard to the identifiers of the fastening means. Thus, after the construction sections are connected to each other, the fastening means that in a first step were initially tightened only hand-tight during connection are again tightened and/or retightened. After all the fastening means have been tightened, further retightening may be carried out. In order to ensure uniform tightening, steps should be taken to ensure that all the fastening means are completely and uniformly tightened to the same tightness, as far as possible, that is with the same tightening force or tightening torque. Checking with reference to the identifier of each fastening means ensures that each individual fastening means has in fact been tightened and/or retightened, and there is no need to confine oneself here to merely checking the total number.

According to an embodiment, a method for checking the fastening means of a connection region of two construction sections of a wind turbine is proposed, said method comprising the steps:

successive checking of the fastening means and establishing a test result in each case, thereby reading each identifier to identify the respective fastening means and assigning each test result to the respectively identified fastening means.

This method for checking may be applied not only during installation of the wind turbine, but also during later maintenance. The fastening means are successively checked, first of all, and a test result may be established in each case. Checking preferably includes at least tightening the fastening means with a determined force or with a determined torque, which may be predetermined. Reaching this predetermined force or predetermined torque can be the test result. Other events are also conceivable, such as recording a torque curve when tightening, or establishing that a desired tightness, i.e., a desired tightening force or desired tightening torque is already present.

Each identifier is likewise read in order to identify the respective fastening means, and assigned to the respective test result. In this way, a test result is available for each fastening means. It is possible to ensure that each fastening means was included in testing, and any abnormalities can be detected and observed. If a problem arises for any fastening means, this problem can readily be assigned to the respective fastening means, and the latter replaced if necessary.

Each test result preferably includes at least one item of information as to whether any check at all has been performed on the fastening means. This means that at least the completeness of the check can be assured. It is beneficial to store, output and/or analyse the test result for each fastening means. In this way, the test result can be available for each individual fastening means and can be fetched again at any time if it has been previously stored in memory. The result can be outputted to make it accessible, and the result can be at least partly analysed.

An error message and/or an error signal may be outputted if it is established that the test of a fastening means has not been carried out correctly. Such an error message or error signal may be outputted when a test is incomplete or also when an error occurs, such as a tightening torque or a tightening force that is too low.

According to another embodiment, the test method is repeated and/or the test results are stored in test records. Such repetition can be carried out, for example, at determined maintenance intervals. In this way, reliable sets of data that can be assigned to each individual fastening means can be generated. A basis for certification can also be established, should this be desired.

An embodiment may achieve a desired, predefined quality of assembly, including reliability. In order to achieve this aim, it may be useful to take into consideration various aspects and features that may complement or be alternatives to each other. These include the applied method for tightening the fastening means, the testing device used, which may also be referred to as a bolting device, the keeping of a log, the detection of the respective fastening means being processed, in particular its identifier, and finally the identifier is used.

When performing the method of an embodiment, the handling sequence should be correct, and/or the number should be correct.

A bolting device may be provided with a reader, an input unit, a display and/or a lock. A reader may detect barcode and/or a structure. An input unit may be provided with input keys, or be used by means of a manual barcode reader.

The display can show whether all the bolts have already been worked on, in particular whether they have been tightened, and/or it can show whether a bolt is missing, and if so, which.

If a lock is intended, this can block any continued work on the fastening means, in particular any tightening of additional fastening means if a prescribed sequence has been interrupted, if too few bolts have been processed and if one or more fastening means, e.g., bolts, have been left out.

Anything of importance for checking may then be noted in a log, or automatically registered by the bolting device or by the testing device. Such information may include an identifier for the fastening means, such as a bolt identifier, the date and time of processing, the operator of the bolting device or testing device, the measured tightening force or the measured tightening torque, and/or the type of assignment on which the log was recorded, namely whether the wind turbine was being installed or being maintained.

Detection can be effected in the course of or by means of manual processing and/or by means of a manual barcode reader.

An identifier may, for example, be subdivided into a barcode and/or a structure. Instead of a barcode, many other automatically detectable identifiers or codings, as described in the foregoing, are likewise conceivable. By means of a barcode, a fastening means such as a bolt can be individualized by itself. A fastening means in the connection region, or specifically a bolt in a flange may likewise be numbered. Not only a bolt, but also its position in the town can be individualized. This, too, can be applied to any fastening means, and to positions elsewhere in the wind turbine, for example on the flange for rotor blade installation. If merely a structure is used as identifier, it is not necessary to predefine the structure.

According to one embodiment at least, an identification system has been proposed that can be used when bolting together flange connections such as tower or rotor blade flanges. It is desirable to ensure that all the bolt connections are properly produced, without bolts being doubly tightened or not tightened at all.

A tower flange is one example of an embodiment in use. When bolting tower flanges, it is desirable to ensure that every bolt is properly tightened. Due to the large number of bolt connections (often more than 100 per flange), what could sometimes happen until now was that individual bolt connections are not tightened, or are doubly tightened. Although double tightening is usually unproblematic, it can lead to the fitter miscounting and assuming that he has bolted all the connections.

It should also be noted that the present disclosure can essentially be applied in other places besides wind turbines, where a number of identical bolt connections exist in a component, for example.

According to one embodiment, a circumferential sticker containing numbering of the bolt connections, i.e., of the fastening means, as well as a simple barcode is affixed to a tower flange. A bolting device, representing an example of a testing device, and which can be adapted to rotate or to pull, is fitted with a barcode reader that, by virtue of its construction, is correctly positioned. The bolting device is programmed in such a way that the quantity, bolt type, tightening torque or preload force for the flange connection are known. The bolting device registers errors, for example when too few bolted connections have been detected, and produces a log that is deposited in the service life folder in the service department. On the basis of this log, a different bolting device or, of course, the same one can check this connection during maintenance work, and test each individual connection for preload force, and/or specify and document the maintenance plan during testing by means of sampling inspections.

An embodiment may reduce, compared to the prior art, the number of bolt connections that are not performed. Other advantages of embodiments are improved logging, monitoring of bolt connections and improved inspection of bolt connections during operation of the wind turbine.

BRIEF DESCRIPTION OF THE SEVERAL VIEWS OF THE DRAWINGS

The disclosure shall now be described in greater detail with reference to embodiments and to the accompanying drawings.

DETAILED DESCRIPTION

Figure 1:
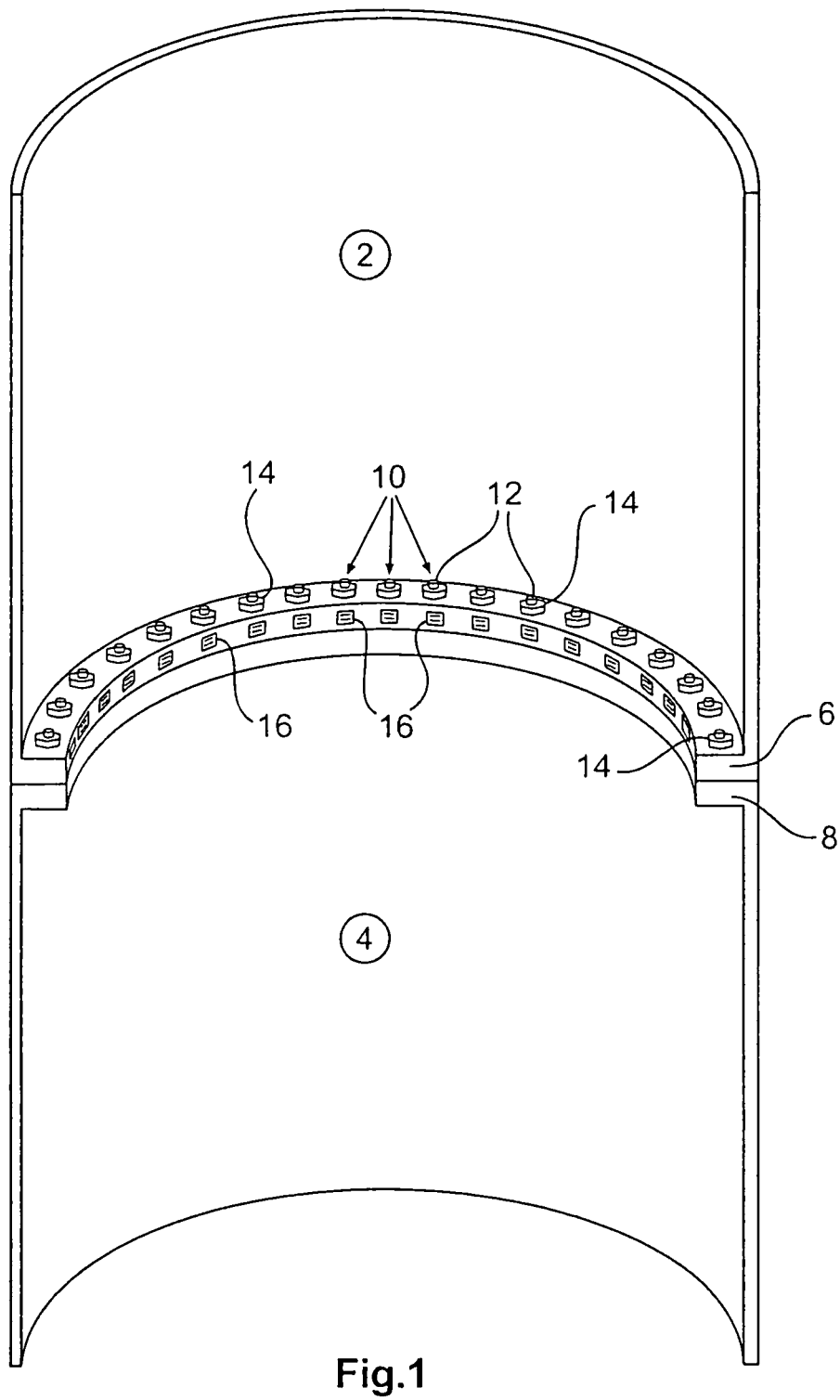
FIG. 1 shows a schematic view of a section of two connected tower segments of a wind turbine according to an embodiment.

FIG. 1 shows, as first and second construction section 2, 4, a first and second tower segment, for illustration purposes in a view from the inside of the tower. The relative sizes of the elements in FIG. 1 say nothing about actual, real proportions. The two tower segments 2, 4 each have an annular flange 6, 8 that serves as a connection region. The two flanges 6, 8 lie one on top of the other in order to connect the two tower segments 2 and 4. A plurality of fastening means 10 are used for fastening. The quantity of such fastening means 10 is no indication of the quantity that are actually used. The fastening means 10 as illustrated each comprise a bolt 12 and a nut 14.

Each fastening means 10 is marked with an identifier 16. For the sake of simplicity, all identifiers 16 bear the same reference sign. However, all the identifiers 16 shown may actually be different from one another. Due to the schematic view, the exact execution of the identifiers 16 cannot be seen from FIG. 1. According to one embodiment, identifiers 16 are executed as barcodes for optical scanning. Each barcode encodes an individual number for each fastening means 10, such that each fastening means 10 can be distinguished from each other fastening means 10 on the basis of said number. A number is also printed in clear paint for the fitter. Aside from identifier 16 and its content, fastening means 10 are basically identical and mainly differ only in respect of their position and their state, in particular in the degree to which each individual fastening means 10 has been tightened. Other distinctions may arise when a fastening means 10 is defective, for example, which is not immediately evident.

To install a wind turbine, fastening means 10 are thus tightened one after the other, after bolt nuts 14 have been placed and screwed onto bolts 12, or tightened hand-tight at least. As shown in FIG. 1, where reference sign 6 refers to the upper annular flange 6, one begins, for example, with the first bolt nut 14 and then tightens all the bolt nuts 14 once, going around annular flange 6. This tightening of all the bolt nuts 14 (to the far right) and hence all the fastening means 10 also includes, of course, that part of annular flange 6 which is not shown in FIG. 1. Hence, in the example illustrated in FIG. 1, 38 fastening means 10 would have to be tightened, of which 19 are shown in FIG. 1. A tower segment of a steel tower of a wind turbine according to an embodiment may actually have a substantially greater number of fastening means per annular flange. Their number can be as high as 100 or even more. It is clear in the illustrated embodiment that one fastening means 10 resembles another and that the fastening means 10 provide hardly any basis for recognition.

According to one embodiment at least, the respective identifier 16 is read when tightening each fastening means 10, and in this way it is easier to establish which fastening means 10 is being tightened at the moment, which one was tightened before it and also, in particular, which one is the next to be tightened.

Even when the barcode is difficult or impossible for the fitter to read, it is easy for him to read the identifier with the aid of a barcode reader. In one embodiment, such a barcode reader is disposed directly on a testing device that the tester uses during installation or maintenance work.

Moreover, during installation especially, once all the fastening means 10 of one annular flange 6 have been tightened once, said operation can be repeated one more time. An embodiment makes it possible that no fastening means is skipped either in the first cycle or in subsequent cycles.

In order that affixing identifiers 16 does not increase the amount of installation work involved, said identifiers may already be disposed, according to the embodiment shown in FIG. 1, on an inner circular surface of annular flange 6. This may be carried out in a simple manner beforehand in the factory workshop. Hence, care can also be taken in the factory workshop to maintain a desired sequence. When preparing fastening means 10, in particular when screwing on bolt nuts 14, there is no need to take heed of the identifier, in particular of the aforementioned sequence. When replacing a fastening means 10 or a part thereof, such as nut 14, the identifier can be kept without any problems.

Figure 2:
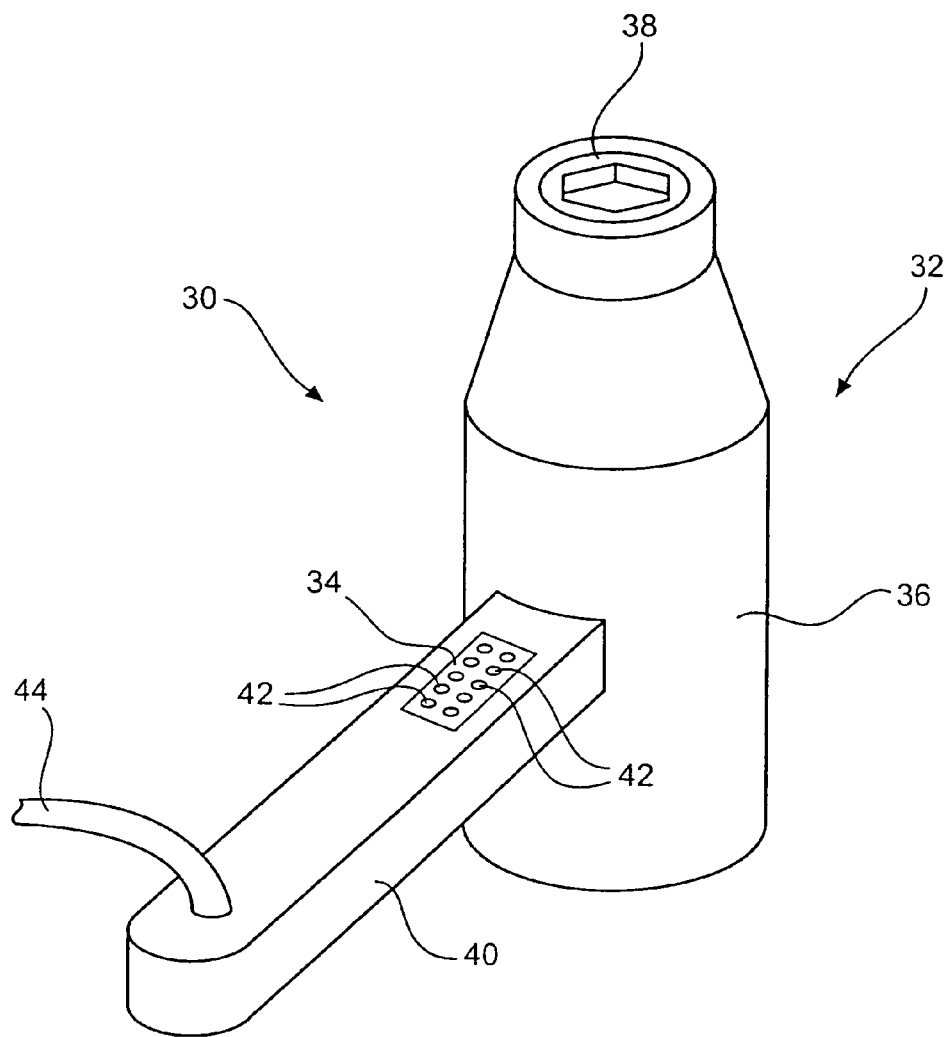
FIG. 2 shows a testing device according to an embodiment, in a schematic view from below.

Testing device 30 shown schematically in FIG. 2 has a tool section 32 for tightening fastening means, such as fastening means 10 in FIG. 1, and a detection unit 34 for detecting the identifier, such as identifier 16 in FIG. 1, of each fastening means. Tool section 32 comprises a housing 36, in which a drive unit for moving a tool key part 38 is accommodated. Tool key part 38 is prepared to be placed onto a bolt nut 14 for tightening, as shown in FIG. 1. Tool key part 38 is often provided in the form of a replaceable wrench socket.

In addition to the drive for tightening a bolt nut and hence for moving tool key part 38, testing device 30 also has a measuring device in housing 36 for measuring the torque applied.

Detection unit 34 is disposed on a grip member 40. Detection unit 34 has a plurality of optical sensors 42 for optically detecting an identifier such as identifier 16 in FIG. 1. By using a plurality of optical sensors 42, identifiers can be sampled in different, albeit similar directions. Testing device 30 in FIG. 2 is prepared to be fitted with tool key part 38 onto a bolt nut 14 as shown in FIG. 1. In this situation, testing device 30 would be rotated approximately 180 degrees relative to the orientation shown in FIG. 2, with the result that the tool key part 38 in FIG. 1 points substantially downwards. Optical sensors 42 and hence detection unit 34 as a whole then point approximately downwards as well, and hence in the direction of the respective identifier 16. In any case, one pair of the optical sensors 42 can read identifier 16.

An appropriate microcomputer for initial processing and intermediate storage is provided in grip member 40. Said microcomputer also cooperates with the measuring device in housing 36 of tool section 32 and can thus assign to identifier 16 the activity of tool section 32, in particular the torque applied and measured, which has been detected approximately simultaneously by detection unit 34.

Testing device 30 also has a lead 44 on its grip member 40, said lead being shown in cropped form only. Said lead 44 is mainly used to supply power to tool section 32. Data lines may also be integrated in lead 44.

Figure 3:
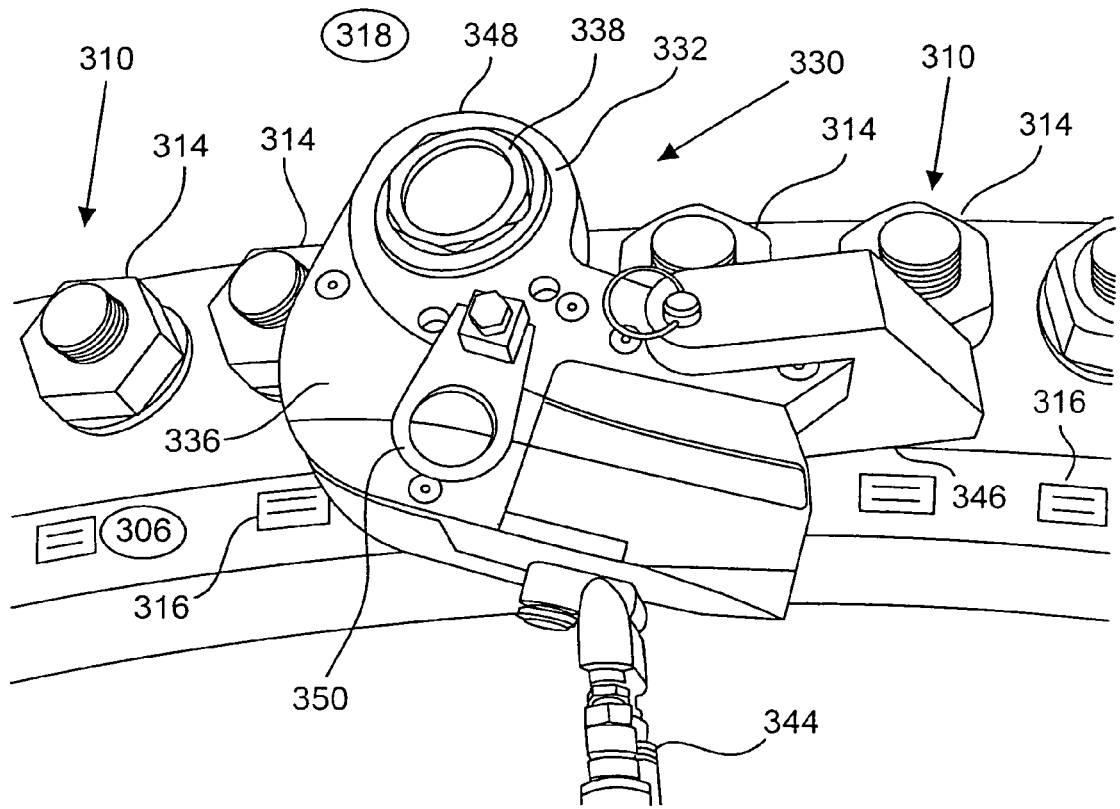
FIG. 3 shows a perspective plan view of another embodiment of a testing device.

Testing device 330 as shown in FIG. 3 is fitted onto a bolt nut 314 of a fastening means 310. Fastening means 310 is disposed on an annular flange 306. A tool key part 338 fitted onto a bolt nut 314 projects through a housing 336 of testing device 330 and is therefore partially visible in FIG. 3 on the top side of housing 336. A tool section 332, in which a drive unit for moving tool key part 338 is accommodated, is disposed in housing 336. Power connections 344 are provided to exert a force on tool key part 338. Testing device 330 also has an auxiliary tab 350, which is optional. As support, and especially to record a torque when tightening a bolt nut 314, testing device 330 also comprises a support member 346. Said support member 346 rests against another bolt nut 314 and thus against another fastening means 310, supporting itself against them when a torque is applied.

Identifiers 316 are disposed on tower flange 306, facing the inside of the tower, and are shown schematically in FIG. 3. A detection unit is disposed on housing 336 on the side facing downwards, and for that reason is not visible in FIG. 3. This detection unit is located on the underside of the housing, approximately in the region between auxiliary tab 350 and power connection 344. As can be seen from FIG. 3, the detection unit faces downwards and in any case in the direction of one of identifiers 316 on tower flange (connection region) 306. Testing device 330 in FIG. 3 can therefore read identifier 306 when in the position of being fitted onto bolt nut 314.

It should be pointed out that testing device 330 in FIG. 3 is fitted onto a bolt nut 314, as a result of which only a very small distance may remain between bolt nut 314 and the neighboring tower wall 318. Thus, testing device 330 may have only a very narrow rim 348 beside tool key part 338. This is a key difference from the testing device 30 shown very schematically in FIG. 2.

Figure 4:
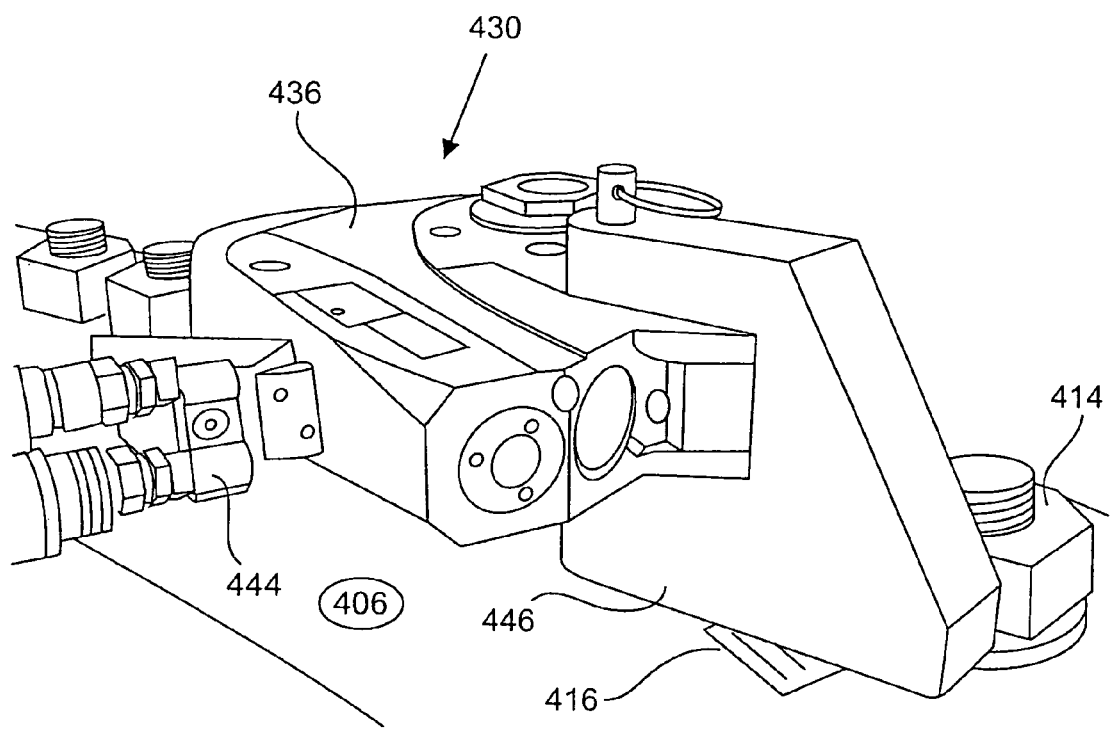
FIG. 4 shows the testing device of FIG. 3 in a perspective side view.

In FIG. 4, a testing device 430 is fitted onto a different bolt nut 414 on a broad flange 406. Testing device 340 in FIG. 4 is substantially identical to testing device 330 in FIG. 3, although auxiliary tab 350 is not present. Identifiers 416 are disposed on an upwardly facing side of flange 406 and are indicated in the region of support member 446. Said identifier 416 is thus disposed under housing 436 of testing device 430, by bolt nut 414 that has just been processed, so that testing device 430 in can detect the respective identifier 416 when in the state shown.

Figure 5:
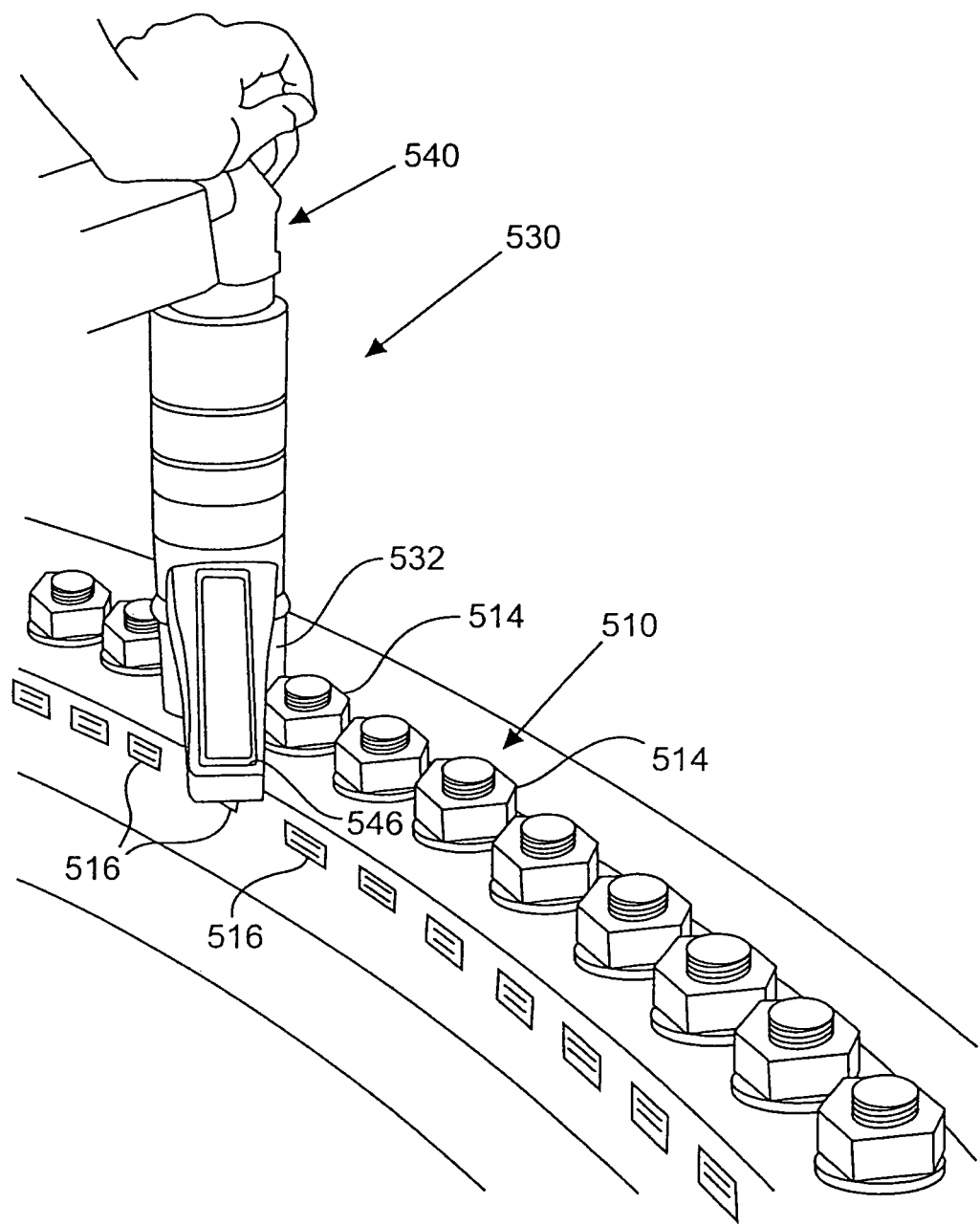
FIG. 5 shows a perspective side view of yet another embodiment of a testing device.

Testing device 530 in FIG. 5 is fitted by its tool section 532 onto one of the bolt nuts 514 of fastening means 510. A support member 546 supports itself on a bolt nut 514 and is provided on its underside with a detection unit for detecting the respective identifier 516. Testing device 530 also has a grip member 540, with which testing device 530 can be held and which has a number of operating elements that are not shown in any further detail. As shown in FIG. 5, testing device 530 is held in the region of grip member 540 by a hand that is schematically indicated.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
    checking a tightness of a plurality of fasteners at a connection region that joins together two adjacent construction sections of a wind turbine;
    obtaining a test result based on the checking of the tightness of the plurality of fasteners;
    reading an identifier associated with the respective fastener, the identifier being located on one of the constructions sections of the wind turbine; and
    associating the test result of each fastener with the respective identifier.

2. The method of claim 1 wherein checking the tightness includes tightening the plurality of fasteners with a determined force or with a determined torque.

3. The method of claim 1 wherein each test result includes at least one item of information as to whether a check has been performed on the respective fastener.

4. The method of claim 1, further comprising at least one of storing, outputting or analyzing the test result for each fastener.

5. The method of claim 1, further comprising:
    comparing the test result to a threshold value;
    outputting an indication of an error when the test result is below the threshold value.

6. The method of claim 1, further comprising repeating the testing at determined maintenance intervals.

7. The method of claim 1, further comprising storing the test results and associated identifiers in test records.

8. A method comprising:
    connecting connection regions of two construction sections of the wind turbine together using a plurality of fasteners;
    tightening each of the plurality of fasteners
    after tightening each one of the plurality of fasteners, associating an identifier with the respective fastener, the identifier being located on one of the construction sections; and
    confirming that each identifier was associated with a respective fastener.

9. The method of claim 8 further comprising:
    retightening the fasteners and rereading each identifier after retightening a respective one of the fasteners; and
    confirming that each fastener and each identifier was retightened.

10. A testing device comprising:
    a tool section configured to check a tightness of each of a plurality of fasteners that couple two construction sections of a wind turbine together at a connection region;
    a data processing device configured to generate a test result for each fastener based on the checked tightness; and
    a detection unit configured to detect a respective identifier associated with each one of the plurality of fasteners, wherein the identifier is located on one of the construction sections, and wherein the data processing device is configured to associate and store the test result for each fastener with a respective one of the plurality of the identifiers.

11. The testing device of claim 10 wherein the detection unit is mounted on the testing device in such a way that while the tool section is checking the tightness of each fastener, the identifier associated with the fastener is also detected.

12. The testing device of claim 10 wherein the data processing device is configured to process data pertaining to the fasteners, the processing including at least one of reading, storing, analyzing, transmitting and outputting said data.

13. The testing device of claim 10 wherein said data processing device is configured to:
    compare the test result with a threshold value;
    output an indication of error when the test result is one of below and above the threshold value; and
    blocking a continuation of testing until the indication of error for the respective fastener has been resolved.

* * * * *